UNITED STATES PATENT OFFICE.

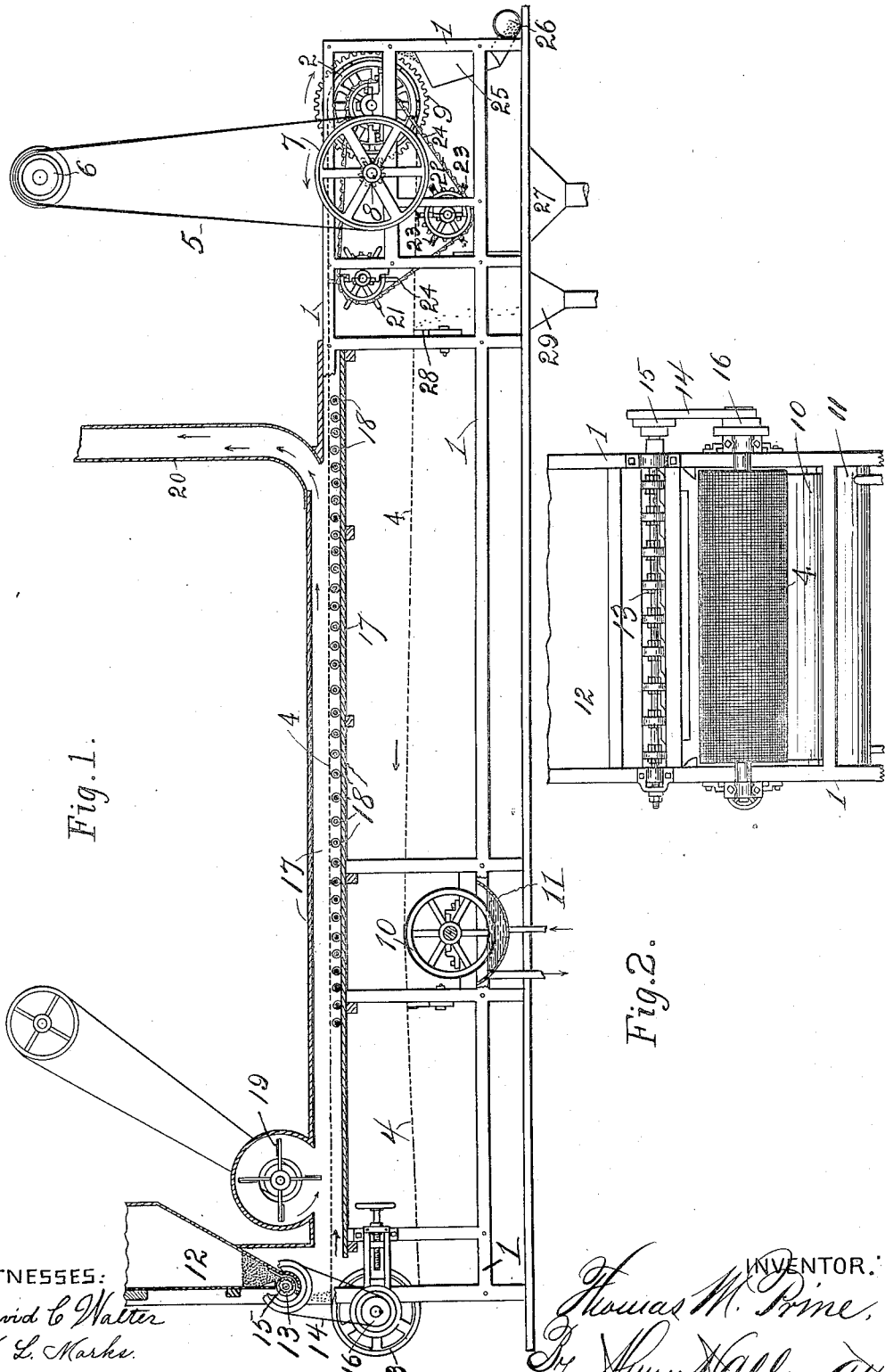

THOMAS M. PRINE, OF TOLEDO, OHIO.

CLOVER-SEED-CLEANING MACHINE.

No. 818,118.  Specification of Letters Patent.  Patented April 17, 1906.

Application filed June 6, 1904. Serial No. 211,317.

*To all whom it may concern:*

Be it known that I, THOMAS M. PRINE, a citizen of the United States, residing at Toledo, in the county of Lucas and State of Ohio, have invented certain new and useful Improvements in Clover-Seed-Cleaning Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

In raising clover the greatest trouble encountered by the farmer is a noxious weed—a species of plantain, variously known as ribwort, ripple-grass, and buckhorn, the latter being its familiar name among dealers in clover-seed. In preparing clover-seed for the market and for sowing it is now quite practicable by the use of modern machinery to separate the clover-seed from all foreign seeds and substances save the seeds of the weed referred to; but these seeds are so nearly like the cover-seed in size, weight, form, and specific gravity that the mechanical separation of the two has heretofore been found impossible. The fact that the presence of five per cent. of "buckhorn" in a bushel of clover-seed sometimes diminishes its market value as much as seventy-five per cent. will illustrate the gravity of the difficulty here pointed out.

My invention relates to and its object is to provide means for overcoming the difficulty above indicated.

In carrying out my invention I avail myself of the discovery which I have made that the objectionable seeds referred to contain, at or near their surface, a substance which upon being moistened becomes mucilaginous or viscid and adhesive and that in clover-seed this property is wholly absent. I utilize this discovery by feeding the mixed seed upon the top of a horizontally-moving endless belt or apron which in its course is moistened before receiving the seed and which, after receiving the seed, is dried. All the foul seed now adheres to the belt and when the dried part of the belt passes over its pulley and is reversed on its return passage the clover-seed, by its own gravity, drops off into a suitable receptacle, while the adhering foul seed passes on with the belt and before the belt is again moistened is scraped off into another and a separate receptacle. I accomplish this operation by means of the devices and arrangement of parts hereinafter described and shown, and illustrated in the accompanying drawings, in which—

Figure 1 is a side elevation of my machine, and Fig. 2 an end elevation of the same seen from the left in Fig. 1.

Like numerals of reference indicate like parts in both views.

In the drawings, 1 is an elongated frame having at one end a drum or pulley 2 and at its other end a drum or pulley 3. Upon these two pulleys travel an endless belt or apron 4, composed of stout canvas or other suitable fabric or flexible material. The belt 4 is driven by a driving-belt 5 on a pair of cone-pulleys 6 7, which permit adjustment of the speed of travel of the belt 4. On the shaft of pulley 7 is a pinion 8, which meshes with and drives gear-wheel 9 on the shaft of drum or pulley 2. The bottom part of the horizontally-traveling belt 4 passes over a roller 10, journaled in the frame of the machine. This roller is covered with felt. The bottom of the roller 10 is immersed and travels in a tank of water 11.

12 is a hopper into which is fed the seed to be treated. In the mouth of the hopper, which is as wide as the belt 4, is a feed-wheel 13, which feeds the seed evenly upon the moving belt below. This feed-wheel is driven by a belt 14 upon a cone-pulley 15 upon the shaft of the feed-wheel and a cone-pulley 16 upon the shaft of the drum 3. By means of this pair of cone-pulleys the feed of seed upon the belt 4 is regulated as may be desired. The top portion of the belt 4 travels through an elongated box 17 and slides upon or close to a horizontal coil of steam-pipe 18, inclosed within the box. A fan 19 blows into one end of the box 17, the blast being discharged at the other end of the box through air-duct 20. Near the drum 2, journaled in the frame, is a wheel 21, having wings or vanes as long as the width of the belt 4, so disposed that they lightly touch the under side of the upper part of the belt 4.

22 is a wheel or drum journaled in the frame, having radially-projecting brushes 23, which when this wheel is revolved lightly brush the under side of the under part of the belt 4. The two wheels or drums 21 22 are driven by chain 24, engaging sprockets on the shafts of the drum 2 and wheels 21 22. Beneath that side of the drum 2 where the belt 4 passes downwardly and changes its direction is a hopper 25 the width of the machine, connected with a suitable conveyer 26, connected with a proper receptacle for the cleaned clover-seed. Beneath the brushes 23 is another hopper 27, also connected with said receptacle. The under side of the belt 4 rests upon and travels over a scraper 28, which extends across the machine the full width of the belt and over a hopper 29.

The operation of my machine is as follows: The pulleys 6 7 being driven, motion is communicated to the belt 4, the feed mechanism, the moistening mechanism, the knocking-wheel, and the brushing-wheel. The fan is also set going and the steam-coil is heated. The belt 4 as it passes over the wheel 10 is moistened. The seed to be treated is fed onto the moistened portion of the belt. Upon coming in contact with the moisture of the belt each foul seed immediately develops a viscid substance which causes the seed to adhere to the belt. As the belt passes through the box 17 and over the heated steam-pipes the belt and the seeds are rapidly dried, the evaporated moisture being carried off by the air-blast. When the upper part of belt 4 passes above the wheel 21, the wings or vanes of the wheel lightly knock against the under side of the belt and loosen any clover-seed that may have adhered to the belt or to a neighboring buckhorn. As the belt travels downwardly over the drum 2 the clover-seeds drop into the hopper 25, the buckhorn passing on with the belt. Should any clover-seed still adhere to the belt, it is now removed by a slight touch of the revolving brushes 23 and drops into the hopper 27. The belt continuing in its course passes over the scraper 28, and all the adhering buckhorn is now scraped off and drops into hopper 29. Thus a complete separation of the clover-seed from the foul seed is effected.

Having described my invention, what I claim, and desire to secure by Letters Patent, is—

1. In a machine of the described class, an apron, means for moving the same, means for moistening the apron, means for drying the apron, means for feeding seed upon the apron after such moistening and before such drying, and means for removing such seed after the drying, the adhering seed at one point in the travel of the apron and the non-adhering seed at another point.

2. In a machine of the described class, a frame, an endless apron mounted to travel horizontally in the frame, means for moistening the apron, means for drying the apron, means at one end of the frame for feeding seeds upon the apron after the moistening operation, and means at the other end of the frame for removing the adhering and the non-adhering seeds at separate points after the drying operation.

3. In a machine of the described class, a frame, a pulley at each end of the frame, an endless apron traveling on the pulleys, means for heating the upper part of the apron, means for moistening the lower part of the apron, means for supplying an air-blast to the upper part of the apron, means at one end of the frame for feeding seed onto the apron, means at the other end of the frame for loosening and removing part of the seed, and a scraper which engages the apron for loosening and removing the remaining part of the seed.

4. In a machine for removing mucilaginous coated seeds from clover and other non-mucilaginous coated varieties, an endless traveling apron, means for dampening the outer surface thereof, a hopper containing the seed to be cleaned, means for feeding the seed in regulated quantities from the hopper upon the dampened surface of the apron and for distributing it thereon, means for drying said apron, brushes for removing all but the mucilaginous coated seeds, and scrapers, acting after said brushes have acted, for removing the mucilaginous coated seeds.

5. In seed-separating apparatus, the combination with a frame, of an endless belt having upper and lower stretches, means engaging the lower stretch of the belt for moistening the same, means located above the upper stretch of the belt for feeding seed thereto while moistened, and heating means located between the stretches of the belt.

6. In seed-separating apparatus, the combination with a movable carrier for seed, of means coacting with the carrier in the successive order named, to wit: means for moistening the belt, means for feeding seed to the belt while moistened, means for drying the belt with the seed thereon, and means for removing the seed from the belt that clings thereto.

7. In seed-separating apparatus, the combination with a movable carrier for seed, of means coacting with the carrier in the successive order named, to wit: means for moistening the belt, means for feeding seed to the same while moistened, means for drying the belt with the seed thereon, means for collecting the seed that does not adhere to the belt, and means for removing the seed that clings to the belt.

8. In seed-separating apparatus, the combination with a carrier-belt, of means for drying the same, and means for passing a current of air over the belt contiguous to the drying means.

9. In seed-separating apparatus, the combination with a support, of means for moistening the support, means for drying the same, and means for feeding the seed to the support between the moistening and drying means and while said support is moistened.

10. In seed-separating apparatus, the combination with an endless belt, of spaced moistening and drying means, and means for feeding seed to the moistened portion of the belt between said moistening and drying means.

In testimony whereof I affix my signature in presence of two witnesses.

THOMAS M. PRINE.

Witnesses:
CLEM V. WAGNER,
M. L. MARKS.